E. MERRITT.
METHOD AND APPARATUS FOR DETECTING OR MEASURING SMALL ELECTROMOTIVE FORCES.
APPLICATION FILED SEPT. 6, 1919.

1,387,552.

Patented Aug. 16, 1921.

INVENTOR.
Ernest Merritt

UNITED STATES PATENT OFFICE.

ERNEST MERRITT, OF ITHACA, NEW YORK.

METHOD AND APPARATUS FOR DETECTING OR MEASURING SMALL ELECTROMOTIVE FORCES.

1,387,552.      Specification of Letters Patent.    Patented Aug. 16, 1921.

Application filed September 6, 1919. Serial No. 322,228.

*To all whom it may concern:*

Be it known that I, ERNEST MERRITT, a citizen of the United States, residing at Ithaca, in the county of Tompkins and State of New York, have invented new and useful Improvements in Methods and Apparatus for Detecting or Measuring Small Electromotive Forces, of which the following is a specification.

The present invention relates to a method and apparatus for detecting or measuring small electromotive forces. The electromotive force is detected by causing it to charge a condenser which is discharged periodically through some current detecting means, such as a telephone.

Figure 1:
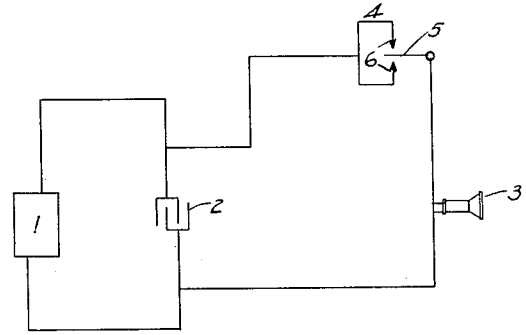
Figure 2:
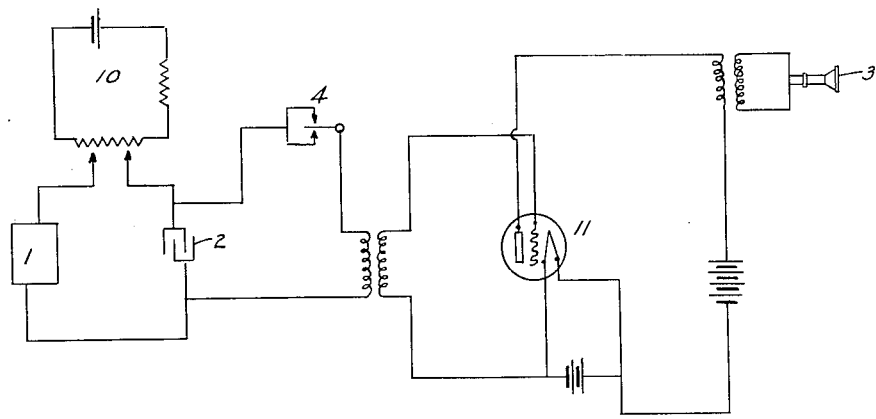

In the drawings, Figure 1 illustrates diagrammatically a simple form of apparatus for detecting a small electromotive force and Fig. 2 illustrates diagrammatically apparatus for measuring a small electromotive force or for detecting small variations in a larger electromotive force.

Referring to the embodiment of the invention illustrated in Fig. 1, the source of the electromotive force 1 which is to be detected, is connected to a condenser 2. In practice condensers having a capacity of from one to two hundred microfarods have been used depending upon conditions. The condenser is periodically discharged through current detecting means, which in this case comprises a telephone receiver, 3, only, by means of a contact maker, 4, which is indicated as a vibrating tongue, 5, moving between two stationary contacts, 6. In practice the tongue, 5, has been vibrated by clock work, but it is obvious that any suitable contact maker may be employed. It is found that the contact should be made from about one to ten times per second. About six contacts per second has been usually adopted. The condenser discharge occurring periodically through the telephone receiver, causes a sound resembling the ticking of a clock. The loudness of the sound gives an indication of the magnitude of the electromotive force.

The contact points should be made of metal which does not corrode and which does not introduce a thermal electromotive force in the circuit. Care should be used that there are no sources of thermal electromotive force in the circuits which are connected to the electromotive force to be measured.

If greater sensitiveness is required, the condenser, 2, may be discharged through an amplifier and a sound much increased in loudness heard in the telephone receiver.

Referring to the modification shown in Fig. 2, the source of electromotive force, 1, is connected to a condenser, 2. A potentiometer, 10, is introduced into this circuit. The condenser, 2, is discharged periodically by a contact maker, 4, through a current detecting device which comprises, in this case, a telephone receiver, 3, with an amplifier, 11, interposed between the condenser and the telephone receiver, 3. The amplifier is shown as the usual audion amplifier, the construction and operation of which is well known to those skilled in this art.

If it is desired to measure the electromotive force, the potentiometer, 10, is adjusted until no sound is heard in the telephone. The electromotive force introduced by the potentiometer is then equal and opposite to that of the electromotive force which is to be measured. If it is desired to detect small variations in a larger electromotive force, the potentiometer, 10, may be so adjusted as to make the sound in the telephone receiver zero and then left without further adjusting. If the electromotive force of, 1, changes, the balance with the potentiometer will be destroyed and sound will be heard in the telephone. The loudness of the sound will indicate the magnitude of the variations in the electromotive force of source, 1.

This method of measuring small electromotive forces is of particular value where the resistance of the circuit containing the small electromotive force to be measured is so large that the measurement by means of a galvanometer would be impracticable. It can also be used to advantage for measuring small electromotive forces under conditions where a sensitive galvanometer cannot be advantageously used, such, for example, as on ship board.

While the present invention has been specifically illustrated and described, it is to be understood that the invention is not limited to its illustrated embodiment but may be embodied in other methods and structures within the scope of the following claims.

I claim:

1. The method of measuring a small electromotive force which consists in connecting the source of the electromotive force to a condenser through a potentiometer, periodically short circuiting the condenser through a current detecting means, and adjusting the potentiometer until no current is detected in the detecting means, substantially as described.

2. The method of measuring a small electromotive force which consists in connecting the source of electromotive force to a condenser through a potentiometer, periodically short circuiting the condenser through a current detecting means which comprises a telephone receiver, and adjusting the potentiometer until no sound is heard in the receiver, substantially as described.

3. The method of detecting variations in electromotive force which consists in connecting the source of electromotive force to a condenser through a second source of electromotive force which is equal and opposite to the first electromotive force and periodically short circuiting the condenser through a current detecting means whereby variations from the balanced conditions are detected, substantially as described.

4. The method of detecting small variations in electromotive forces which consists in connecting the source of electromotive force to a condenser through a second source of electromotive force, and periodically short circuiting the condenser through current detecting means which comprises a telephone receiver, whereby variations of the electromotive force from the balanced condition will be indicated by audible ticks in the receiver, substantially as described.

5. The combination with a source of electromotive force to be detected or measured, of a circuit connected therewith and containing a condenser and adjustable opposing electromotive force, a current detecting means, and means for periodically short circuiting the condenser through the current detecting means, substantially as described.

6. The combination with a source of electromotive forces to be detected or measured, of a circuit connected therewith and containing a condenser and adjustable opposing electromotive force, a current detecting means which comprises a telephone receiver, and means periodically short circuiting the condenser through the current detecting means, substantially as described.

ERNEST MERRITT.